US012237685B2

(12) United States Patent
Hamada et al.

(10) Patent No.: US 12,237,685 B2
(45) Date of Patent: Feb. 25, 2025

(54) POWER MANAGEMENT SYSTEM, SERVER, AND POWER SUPPLY AND DEMAND ADJUSTMENT

(71) Applicant: TOYOTA JIDOSHA KABUSHIKI KAISHA, Toyota (JP)

(72) Inventors: Shigetaka Hamada, Nisshin (JP); Haruka Hirose, Toyota (JP); Yusuke Horii, Nagoya (JP); Toru Nakamura, Toyota (JP); Takaaki Sano, Izumi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 469 days.

(21) Appl. No.: 17/571,684

(22) Filed: Jan. 10, 2022

(65) Prior Publication Data
US 2022/0239108 A1 Jul. 28, 2022

(30) Foreign Application Priority Data
Jan. 28, 2021 (JP) .................................. 2021-011919

(51) Int. Cl.
*H02J 3/14* (2006.01)
*G05B 15/02* (2006.01)
(Continued)

(52) U.S. Cl.
CPC .............. *H02J 3/381* (2013.01); *G05B 15/02* (2013.01); *H02J 3/144* (2020.01); *H02J 3/28* (2013.01);
(Continued)

(58) Field of Classification Search
USPC ......................................................... 700/295
See application file for complete search history.

(56) References Cited

U.S. PATENT DOCUMENTS

2012/0065792 A1\* 3/2012 Yonezawa ............... H02J 3/003
700/291
2017/0090498 A1\* 3/2017 Jetcheva ................ G05B 15/02
(Continued)

FOREIGN PATENT DOCUMENTS

JP 2013-118725 A 6/2013
JP 2014-215844 A 11/2014
(Continued)

*Primary Examiner* — Emilio J Saavedra
(74) *Attorney, Agent, or Firm* — Finnegan, Henderson, Farabow, Garrett and Dunner, LLP

(57) ABSTRACT

A power management system includes a CEMS server that outputs a DR request to a plurality of power adjustment resources such that balancing is achieved every prescribed time period. The plurality of power adjustment resources include: a power-storage-type DER that stores the supply power in an energy form of at least one of electricity, heat and gas fuel; and a consumption-type DER that consumes the supply power by at least one of air conditioning and lighting. In a case where it is expected in the middle of the prescribed time period that the actual amount of power exceeds the planned amount of power at the end of the prescribed time period, the CEMS server outputs, to the power-storage-type DER more preferentially than to the consumption-type DER, the DR request for decreasing the actual amount of power in comparison with before expectation.

9 Claims, 7 Drawing Sheets

(51) Int. Cl.
*H02J 3/28* (2006.01)
*H02J 3/38* (2006.01)
*H02J 13/00* (2006.01)

(52) U.S. Cl.
CPC ..... *H02J 13/00004* (2020.01); *H02J 2300/24* (2020.01); *H02J 2310/12* (2020.01); *H02J 2310/14* (2020.01)

(56) References Cited

U.S. PATENT DOCUMENTS

| | | | | |
|---|---|---|---|---|
| 2018/0083482 | A1* | 3/2018 | Hong | H02J 13/00006 |
| 2019/0130423 | A1 | 5/2019 | Watanabe et al. | |
| 2023/0039756 | A1* | 2/2023 | Joko | H01M 10/4257 |

FOREIGN PATENT DOCUMENTS

| | | | |
|---|---|---|---|
| JP | 2019-082935 A | | 5/2019 |
| JP | 2020167815 A | * | 10/2020 |

* cited by examiner

POWER MANAGEMENT SYSTEM, SERVER, AND POWER SUPPLY AND DEMAND ADJUSTMENT

This nonprovisional application is based on Japanese Patent Application No. 2021-011919 filed on Jan. 28, 2021 with the Japan Patent Office, the entire contents of which are hereby incorporated by reference.

BACKGROUND

Field

The present disclosure relates to a power management system, a server, and a power supply and demand adjustment method.

Description of the Background Art

In a power management system that manages power supply and demand in a power grid, it is requested to substantially match an amount of power demand by the power grid with an amount of power supply from a power system to the power grid. Actually, however, the amount of power demand and the amount of power supply do not match with each other in some cases due to failure of prediction of power demand and the like, which may result in a power imbalance. Japanese Patent Laying-Open No. 2019-082935 discloses a histogram about such an imbalance.

SUMMARY

In a microgrid that is supplied with electric power from a power system built by an electric power company, an amount of supply power to the microgrid every prescribed time period (e.g., every 30 minutes) is planned in accordance with a contract that is preliminarily signed with the electric power company. In order to stabilize the power of the power system, it is required to substantially match a planned amount of supply power (hereinafter, also referred to as "planned amount of power") with an actual amount of supply power (hereinafter, also referred to as "actual amount of power"). The control therefor will also called "balancing".

Generally, a power management system is provided with a plurality of "power adjustment resources" used to adjust supply power from a power system to a power grid. Specific examples of the power adjustment resources include a power generator, an energy storage system, a heat storage system, an air-conditioning facility, a lighting fixture and the like. Although details will be described below, user convenience and comfortability may be lost when too much importance is placed on achievement of balancing and the power adjustment resources are not appropriately controlled.

The present disclosure has been made to solve the above-described problem, and an object of the present disclosure is to suppress a reduction in user convenience and comfortability as much as possible when achieving balancing.

(1) A power management system according to a first aspect of the present disclosure manages power supply and demand in a power grid. The power management system includes: a plurality of power adjustment resources used to adjust supply power from a power system to the power grid; and a controller that outputs a demand response (DR) request to the plurality of power adjustment resources such that balancing is achieved, the balancing being control for matching an actual amount of power with a planned amount of power every prescribed time period. The plurality of power adjustment resources include: a power-storage-type distributed energy resource (DER) that stores the supply power in an energy form of at least one of electricity, heat and gas fuel; and a consumption-type DER that consumes the supply power by at least one of air conditioning and lighting. In a case where it is expected in the middle of the prescribed time period that the actual amount of power exceeds the planned amount of power at the end of the prescribed time period, the controller outputs, to the power-storage-type DER more preferentially than to the consumption-type DER, the DR request for decreasing the actual amount of power in comparison with before expectation.

(2) In the case where it is expected in the middle of the prescribed time period that the actual amount of power exceeds the planned amount of power at the end of the prescribed time period, (a) when the excess of the actual amount of power can be eliminated by suppressing storage of the supply power by the power-storage-type DER, the controller outputs, to the power-storage-type DER, the DR request for suppressing storage of the supply power in comparison with before expectation, and does not output, to the consumption-type DER, the DR request for suppressing consumption of the supply power in comparison with before expectation, and (b) when the excess of the actual amount of power cannot be eliminated only by suppressing storage of the supply power by the power-storage-type DER, the controller outputs, to the power-storage-type DER, the DR request for suppressing storage of the supply power in comparison with before expectation, and also outputs, to the consumption-type DER, the DR request for suppressing consumption of the supply power in comparison with before expectation.

In the configuration in (1) and (2) described above, when it is required to decrease the supply power to the power grid in the middle of the prescribed time period, the controller performs power adjustment using the power-storage-type DER (e.g., an energy storage system, EVSE, a vehicle, or a heat storage system described below) more preferentially than power adjustment using the consumption-type DER (e.g., an air-conditioning facility or a lighting fixture). This means that when the supply power to the power grid is decreased, power adjustment using the power-storage-type DER that is less likely to affect user convenience or comfortability is performed more preferentially than power adjustment using the consumption-type DER that may affect user convenience or comfortability. For example, when the cooling temperature of the air-conditioning facility is increased or the heating temperature of the air-conditioning facility is decreased, the user may feel deterioration of the effect of air conditioning and user comfortability may be reduced. In addition, when the lighting fixture becomes dark, user convenience and comfortability may also be reduced. According to the configuration in (1) and (2) described above, such a situation is less likely to occur, and thus, a reduction in user convenience and comfortability when achieving balancing can be suppressed as much as possible.

(3) In the case where it is expected in the middle of the prescribed time period that the actual amount of power becomes insufficient relative to the planned amount of power at the end of the prescribed time period, the controller outputs, to the consumption-type DER more preferentially than to the power-storage-type DER, the DR request for increasing the actual amount of power in comparison with before expectation.

(4) In the case where it is expected in the middle of the prescribed time period that the actual amount of power becomes insufficient relative to the planned amount of power at the end of the prescribed time period, (c) when the insufficiency of the actual amount of power can be eliminated by promoting consumption of the supply power by the consumption-type DER, the controller outputs, to the consumption-type DER, the DR request for promoting consumption of the supply power in comparison with before expectation, and does not output, to the power-storage-type DER, the DR request for promoting storage of the supply power in comparison with before expectation, and (d) when the insufficiency of the actual amount of power cannot be eliminated only by promoting consumption of the supply power by the consumption-type DER, the controller outputs, to the consumption-type DER, the DR request for promoting consumption of the supply power in comparison with before expectation, and also outputs, to the power-storage-type DER, the DR request for promoting storage of the supply power in comparison with before expectation.

In the configuration in (3) and (4) described above, when it is required to increase the supply power to the power grid in the middle of the prescribed time period, the controller performs power adjustment using the consumption-type DER more preferentially than power adjustment using the power-storage-type DER. This means that when the supply power to the power grid is increased, power adjustment using the consumption-type DER that may affect user convenience or comfortability is performed more preferentially than power adjustment using the power-storage-type DER that is less likely to affect user convenience or comfortability. For example, even when the cooling temperature of the air-conditioning facility is decreased or the heating temperature of the air-conditioning facility is increased, the user only feels the enhancement of the effect of air conditioning, and thus, a reduction in user comfortability is less likely to occur. In addition, even when the lighting fixture becomes slightly brighter, a reduction in user convenience is less likely to occur. Thus, according to the configuration in (3) and (4) described above, a reduction in user convenience and comfortability when achieving balancing can be suppressed as much as possible.

(5) A server according to a second aspect of the present disclosure manages a plurality of power adjustment resources used to adjust supply power from a power system to a power grid. The plurality of power adjustment resources include: a power-storage-type DER that stores the supply power in an energy form of at least one of electricity, heat and gas fuel; and a consumption-type DER that consumes the supply power by at least one of air conditioning and lighting. The server includes: a processor; and a memory that stores a program executed by the processor. The processor outputs a DR request to the plurality of power adjustment resources such that balancing is achieved, the balancing being control for matching an actual amount of power with a planned amount of power every prescribed time period. In a case where it is expected in the middle of the prescribed time period that the actual amount of power exceeds the planned amount of power at the end of the prescribed time period, the processor outputs, to the power-storage-type DER more preferentially than to the consumption-type DER, the DR request for decreasing the actual amount of power in comparison with before expectation.

(6) In the case where it is expected in the middle of the prescribed time period that the actual amount of power exceeds the planned amount of power at the end of the prescribed time period, (a) when the excess of the actual amount of power can be eliminated by suppressing storage of the supply power by the power-storage-type DER, the processor outputs, to the power-storage-type DER, the DR request for suppressing storage of the supply power in comparison with before expectation, and does not output, to the consumption-type DER, the DR request for suppressing consumption of the supply power in comparison with before expectation, and (b) when the excess of the actual amount of power cannot be eliminated only by suppressing storage of the supply power by the power-storage-type DER, the processor outputs, to the power-storage-type DER, the DR request for suppressing storage of the supply power in comparison with before expectation, and also outputs, to the consumption-type DER, the DR request for suppressing consumption of the supply power in comparison with before expectation.

According to the configuration in (5) and (6) described above, a reduction in user convenience and comfortability when achieving balancing can be suppressed as much as possible, similarly to the configuration in (1) and (2) described above.

(7) In the case where it is expected in the middle of the prescribed time period that the actual amount of power becomes insufficient relative to the planned amount of power at the end of the prescribed time period, the processor outputs, to the consumption-type DER more preferentially than to the power-storage-type DER, the DR request for increasing the actual amount of power in comparison with before expectation.

(8) In the case where it is expected in the middle of the prescribed time period that the actual amount of power becomes insufficient relative to the planned amount of power at the end of the prescribed time period, (c) when the insufficiency of the actual amount of power can be eliminated by promoting consumption of the supply power by the consumption-type DER, the processor outputs, to the consumption-type DER, the DR request for promoting consumption of the supply power in comparison with before expectation, and does not output, to the power-storage-type DER, the DR request for promoting storage of the supply power in comparison with before expectation, and (d) when the insufficiency of the actual amount of power cannot be eliminated only by promoting consumption of the supply power by the consumption-type DER, the processor outputs, to the consumption-type DER, the DR request for promoting consumption of the supply power in comparison with before expectation, and also outputs, to the power-storage-type DER, the DR request for promoting storage of the supply power in comparison with before expectation.

According to the configuration in (7) and (8) described above, a reduction in user convenience and comfortability when achieving balancing can be suppressed as much as possible, similarly to the configuration in (3) and (4) described above.

(9) A power supply and demand adjustment method according to a third aspect of the present disclosure manages a plurality of power adjustment resources used to adjust supply power from a power system to a power grid. The plurality of power adjustment resources receive a DR request for achieving balancing, the balancing being control for matching an actual amount of power with a planned amount of power every prescribed time period. The plurality of power adjustment resources include: a power-storage-type DER that stores the supply power in an energy form of at least one of electricity, heat and gas fuel; and a consumption-type DER that consumes the supply power by at least one of air conditioning and lighting. The method includes a first step and a second step. The first step is expecting in the middle of the prescribed time period whether or not the actual amount of power exceeds the planned amount of power at the end of the prescribed time period. The second step is in a case where it is expected that the actual amount of power exceeds the planned amount of power, outputting, to the power-storage-type DER more preferentially than to the consumption-type DER, the DR request for decreasing the actual amount of power in comparison with before expectation.

(10) The second step includes a third step and a fourth step of performing the following process in the case where it is expected that the actual amount of power exceeds the planned amount of power. The third step is when the excess of the actual amount of power can be eliminated by suppressing storage of the supply power by the power-storage-type DER, outputting, to the power-storage-type DER, the DR request for suppressing storage of the supply power in comparison with before expectation, and not outputting, to the consumption-type DER, the DR request for suppressing consumption of the supply power in comparison with before expectation. The fourth step is when the excess of the actual amount of power cannot be eliminated only by suppressing storage of the supply power by the power-storage-type DER, outputting, to the power-storage-type DER, the DR request for suppressing storage of the supply power in comparison with before expectation, and also outputting, to the consumption-type DER, the DR request for suppressing consumption of the supply power in comparison with before expectation.

According to the method in (9) and (10) described above, a reduction in user convenience and comfortability when achieving balancing can be suppressed as much as possible, similarly to the configuration in (1) and (2) described above.

(11) The power supply and demand adjustment method further includes a fifth step and a sixth step. The fifth step is expecting in the middle of the prescribed time period whether or not the actual amount of power becomes insufficient relative to the planned amount of power at the end of the prescribed time period. The sixth step is in the case where it is expected that the actual amount of power becomes insufficient relative to the planned amount of power, outputting, to the consumption-type DER more preferentially than to the power-storage-type DER, the DR request for increasing the actual amount of power in comparison with before expectation.

(12) The sixth step includes a seventh step and an eighth step of performing the following process in the case where it is expected that the actual amount of power becomes insufficient relative to the planned amount of power. The seventh step is when the insufficiency of the actual amount of power can be eliminated by promoting consumption of the supply power by the consumption-type DER, outputting, to the consumption-type DER, the DR request for promoting consumption of the supply power in comparison with before expectation, and not outputting, to the power-storage-type DER, the DR request for promoting storage of the supply power in comparison with before expectation. The eighth step is when the insufficiency of the actual amount of power cannot be eliminated only by promoting consumption of the supply power by the consumption-type DER, outputting, to the consumption-type DER, the DR request for promoting consumption of the supply power in comparison with before expectation, and also outputting, to the power-storage-type DER, the DR request for promoting storage of the supply power in comparison with before expectation.

According to the method in (11) and (12) described above, a reduction in user convenience and comfortability when achieving balancing can be suppressed as much as possible, similarly to the configuration in (3) and (4) described above.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
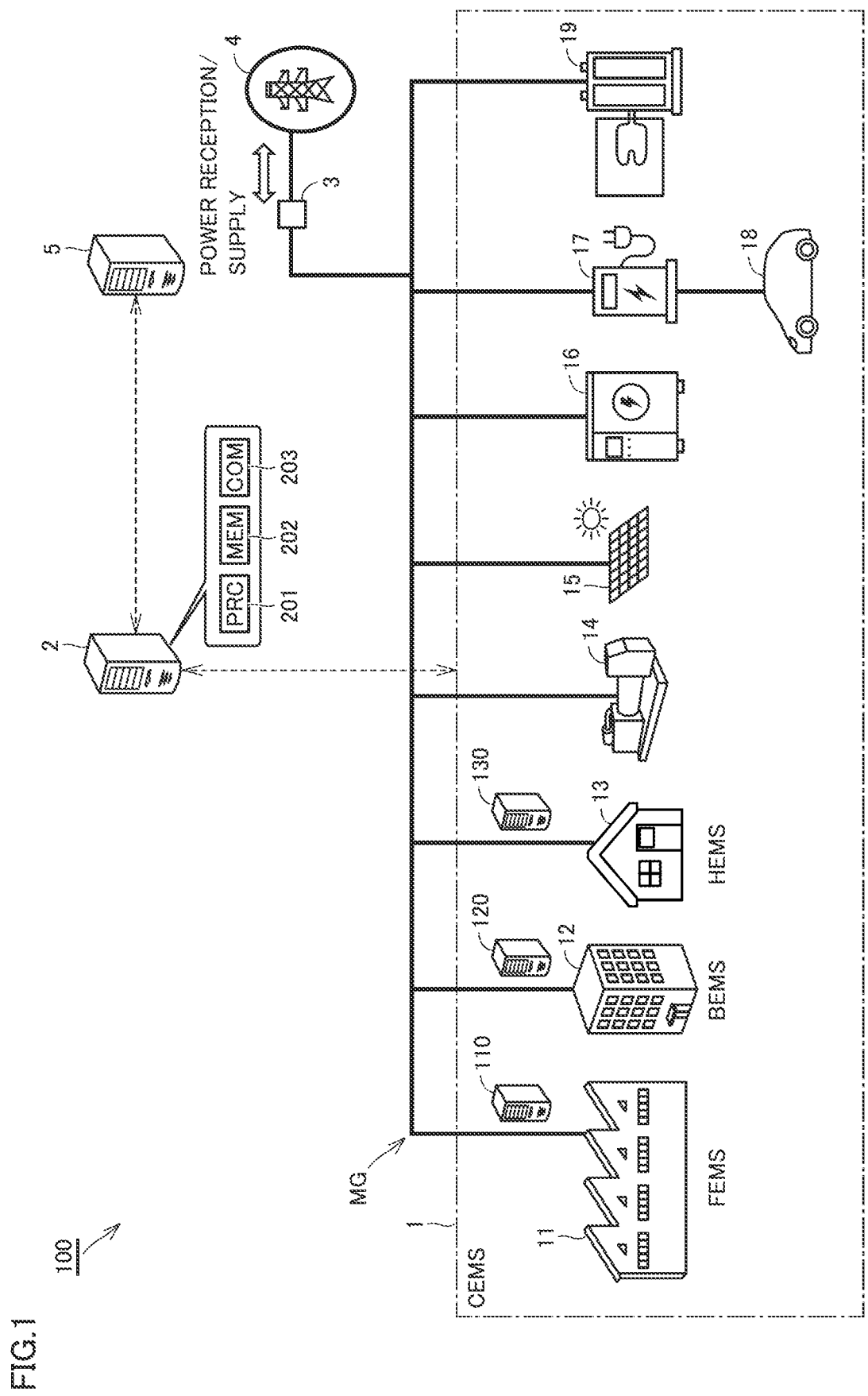
FIG. 1 shows a schematic configuration of a power management system according to a first embodiment of the present disclosure.

Embodiments of the present disclosure will be described in detail hereinafter with reference to the drawings, in which the same or corresponding portions are denoted by the same reference characters, and description thereof will not be repeated.

First Embodiment

<Overall Configuration of Power Management System>

FIG. 1 shows a schematic configuration of a power management system according to a first embodiment of the present disclosure. A power management system 100 includes a CEMS 1, a CEMS server 2, a power reception and transformation facility 3, a power system 4, and a power transmission and distribution business operator server 5. CEMS stands for Community Energy Management System or City Energy Management System.

CEMS 1 includes a factory energy management system (FEMS) 11, a building energy management system (BEMS)

12, a home energy management system (HEMS) 13, a power generator 14, a variable renewable energy (VRE) source 15, an energy storage system (ESS) 16, electric vehicle supply equipment (EVSE) 17, a vehicle 18, and a heat storage system 19. In CEMS 1, these components form a microgrid MG. Microgrid MG corresponds to an example of "power grid" according to the present disclosure.

FEMS 11 is a system that manages supply and demand of electric power used in a factory. FEMS 11 includes a factory building (including an air-conditioning facility, a lighting fixture and the like), an industrial facility (such as a production line) and the like that operate using electric power supplied from microgrid MG. Although not shown, FEMS 11 may include a power generation facility (such as a power generator or a solar panel) placed in the factory. Electric power generated by the power generation facility may also be supplied to microgrid MG. FEMS 11 may include a power generation facility (such as a solar panel), or may include a cold source system (such as a waste heat recovery system or a heat storage system). FEMS 11 further includes an FEMS server 110 that can bidirectionally communicate with CEMS server 2.

BEMS 12 is a system that manages supply and demand of electric power used in a building such as an office or a commercial facility. BEMS 12 includes an air-conditioning facility and a lighting fixture placed in the building. BEMS 12 may include a power generation facility and/or a cold source system. BEMS 12 further includes a BEMS server 120 that can bidirectionally communicate with CEMS server 2.

HEMS 13 is a system that manages supply and demand of electric power used at home. HEMS 13 includes a household device (such as an air-conditioning facility, a lighting fixture and another electric appliance) that operates using electric power supplied from microgrid MG. HEMS 13 may also include a solar panel, a household heat pump system, a household cogeneration system, a household power storage battery or the like. HEMS 13 further includes an HEMS server 130 that can bidirectionally communicate with CEMS server 2.

Power generator 14 is a power generation facility that does not depend on weather conditions, and outputs generated electric power to microgrid MG. Power generator 14 may include a steam turbine generator, a gas turbine generator, a diesel engine generator, a gas engine generator, a biomass generator, a stationary-type fuel cell or the like. Power generator 14 may include a cogeneration system that uses heat generated during power generation.

VRE source 15 is a power generation facility whose power generation output fluctuates depending on weather conditions, and outputs generated electric power to microgrid MG. Although FIG. 1 shows a photovoltaic power generation facility (solar panel) by way of example, VRE source 15 may include a wind power generation facility instead of or in addition to the photovoltaic power generation facility.

Energy storage system 16 is a stationary-type power storage device that stores the electric power generated by VRE source 15 and the like. The power storage device is a secondary battery such as a lithium ion battery or a nickel-metal hydride battery, and a battery for traveling (recycled battery) mounted on a vehicle in the past can, for example, be used. However, energy storage system 16 is not limited to the secondary battery, and may be a power to gas device that produces gas fuel (such as hydrogen or methane) using surplus electric power.

EVSE 17 is a charger that charges vehicle 18. EVSE 17 may be a home charger. EVSE 17 may be electrically connected to microgrid MG to perform discharging (power feeding) to microgrid MG.

Vehicle 18 is specifically a plug-in hybrid electric vehicle (PHEV), a battery electric vehicle (BEV) or the like. Vehicle 18 receives electric power from microgrid MG when a charging cable extending from EVSE 17 is connected to an inlet (not shown) of vehicle 18 (external charging). Vehicle 18 may supply electric power to microgrid MG when the charging cable is connected to an outlet (not shown) of vehicle 18 (external power feeding).

Heat storage system 19 includes a heat storage tank provided between a heat source device and a load (such as an air-conditioning facility), and temporarily stores a liquid medium in the heat storage tank, with the liquid medium kept warm. By using heat storage system 19, a time lag can be provided between generation and consumption of heat. For example, heat generated by consuming electric power to operate the heat source device during the night can be stored in the heat storage tank, and the heat can be consumed to perform air conditioning during the daytime.

Although one FEMS 11, one BEMS 12, one HEMS 13, one power generator 14, one VRE source 15, one energy storage system 16, one EVSE 17, one vehicle 18, and one heat storage system 19 are included in CEMS 1 in the example shown in FIG. 1, the number of these systems or facilities included in CEMS 1 is arbitrary. CEMS 1 may include a plurality of these systems or facilities. Alternatively, some of these systems or facilities may not be included in CEMS 1. FEMS 11, BEMS 12 and/or HEMS 13 may include a facility such as a power generator, or may include the EVSE and the vehicle. Each of these systems or facilities corresponds to an example of "a plurality of power adjustment resources" according to the present disclosure.

Energy storage system 16, EVSE 17, vehicle 18, and heat storage system 19 correspond to "power-storage-type DERs" according to the present disclosure. DER stands for Distributed Energy Resource. "Power-storage-type DERs" may include the power generation facility and the cold source system provided in. FEMS 11 or BEMS 12, or may include the household cogeneration system, the household power storage battery and the like provided in HEMS 13. The air-conditioning facility and the lighting fixture placed in the factory building in FEMS 11, the air-conditioning facility and the lighting fixture placed in the building in BEMS 12, the household heat pump system in HEMS 13, and the air-conditioning facility and the lighting fixture of the household device correspond to "consumption-type DERs" according to the present disclosure. Power generator 14 and VRE source 15 can call "power-generation-type DERs".

CEMS server 2 is a computer that manages the power adjustment resources in CEMS 1. CEMS server 2 includes a controller 201, a storage device 202 and a communication device 203. Controller 201 includes a processor, and executes a prescribed computation process. Storage device 202 includes a memory that stores a program executed by controller 201, and stores various types of information (such as a map, a relational equation and a parameter) used in the program. Storage device 202 also includes a database, and stores data (such as a power generation history and a power consumption history) related to electric power of the systems or the facilities included in CEMS 1. Communication device 203 includes a communication interface, and communicates with the outside (such as another server).

CEMS server 2 may be an aggregator server. The aggregator refers to an electric power supplier that controls a plurality of power adjustment resources and provides an energy management service. CEMS server 2 corresponds to an example of "controller" or "server" according to the present disclosure. The server (110, 120, 130) included in each of FEMS 11, BEMS 12 and HEMS 13 can also serve as "controller" or "server" according to the present disclosure.

Power reception and transformation facility 3 is provided at a power receiving point (interconnection point) of microgrid MG, and switches between parallel on (connection) and parallel off (disconnection) of microgrid MG and power system 4. Power reception and transformation facility 3 includes a high-voltage-side (primary-side) switchgear, a transformer, a protective relay, a measuring device, and a controller, although all are not shown. When microgrid MG is interconnected with power system 4, power reception and transformation facility 3 receives AC power having, for example, a particularly high voltage (voltage exceeding 7000 V) from power system 4, and steps down the received electric power, which is supplied to microgrid MG.

Power system 4 is a power grid formed by a power plant and a power transmission and distribution facility. In the present embodiment, an electric power company serves as a power generation business operator and a power transmission and distribution business operator. The electric power company corresponds to a general power transmission and distribution business operator and also corresponds to a manager of power system 4, and the electric power company performs maintenance and management of power system 4.

Power transmission and distribution business operator server 5 belongs to the electric power company, and is a computer that manages power supply and demand in power system 4. Power transmission and distribution business operator server 5 can also bidirectionally communicate with CEMS server 2.

<Balancing>

A manager of CEMS 1 and the electric power company that performs maintenance and management of power system 4 are under contract about an amount of electric power supplied from power system 4 to microgrid MG every prescribed time period (e.g., every 30 minutes). In accordance with this contract, it is required for CEMS server 2 to adjust an actual amount of supply power (actual amount of power) from power system 4 to microgrid MG such that the actual amount of power substantially matches with a preliminarily planned amount of supply power (planned amount of power). The control for adjustment is called "balancing", and is called "30-minute balancing" particularly when the time period is 30 minutes.

The target time period of balancing is not limited to 30 minutes. The target time period of balancing may be shorter than 30 minutes (e.g., 10 minutes), or may be longer than 30 minutes (e.g., one hour). The target time period of balancing can be arbitrarily determined depending on the contract.

Figure 2:
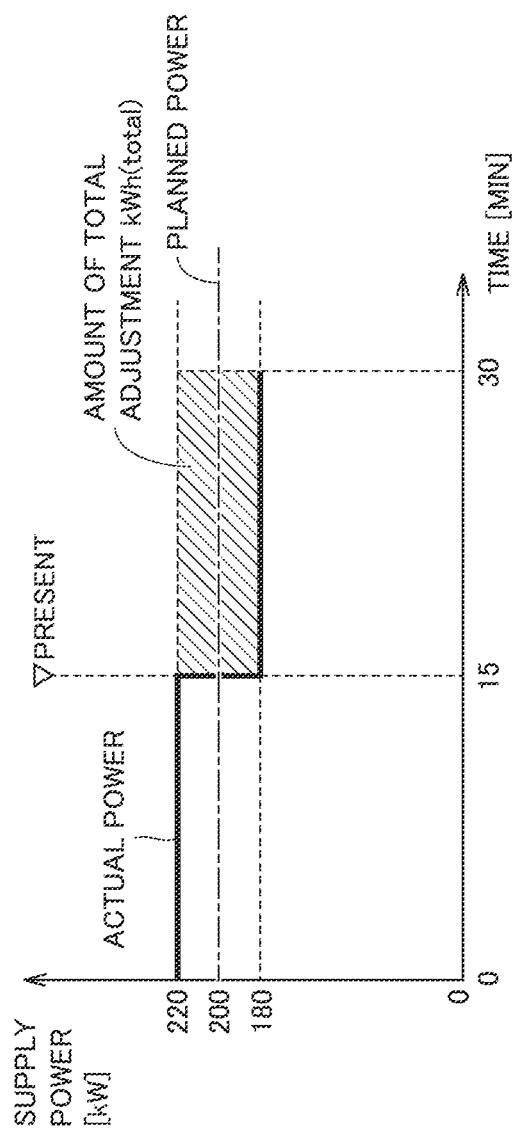
FIG. 2 is a time chart for illustrating an example of 30-minute balancing in the first embodiment.

FIG. 2 is a time chart for illustrating an example of 30-minute balancing in the first embodiment. In FIG. 2 (and FIG. 5 described below), the horizontal axis indicates the elapsed time (unit: minute). The initial time (time=0) corresponds to the start time of 30-minute balancing. The vertical axis indicates supply power (unit: kW) from power system 4 to microgrid MG.

As an example, let us assume that the amount of power supplied from power system 4 to microgrid MG for 30 minutes is set at 100 kWh. In this case, assuming that the supply power is always constant, the supply power is 200 kW. In the figure, this supply power is denoted as "planned power" (see the alternate long and short dash line).

In this example, CEMS server 2 checks the amount of supply power from power system 4 to microgrid MG when the first half (15 minutes) of the target time period of balancing elapses. For the sake of simplicity, assume that the actual supply power (actual power) is constant at 220 kW (see the thick solid line). In such a case, if nothing is done, it is expected that the actual amount of power exceeds the planned amount of power at the end of the time period of balancing, and thus, it is conceivable to set an average of the supply power at 180 kW for the remaining 15 minutes. Therefore, CEMS server 2 outputs a demand response (DR) request to various power adjustment resources in CEMS 1 and performs feedback control of the power adjustment resources such that the supply power is decreased from 220 kW to 180 kW. As a result, various types of power (such as generated power, stored power and consumed power) in CEMS 1 can be decreased as appropriate, which makes it possible to comply with the above-described contract.

The inventors of the present disclosure have focused attention on the fact that the achievement of balancing as described above may cause a problem described below. If the achievement of balancing is only required, CEMS server 2 may freely output the DR request to various power adjustment resources. However, from the viewpoint of placing importance on the user's living environment in CEMS 1, what kind of power adjustment resources are used and how power adjustment is performed may become problematic. As a result of power adjustment in accordance with the DR request from CEMS server 2, the operation of the power adjustment resources may be restricted or the power adjustment resources cannot be operated as intended by the user, which may lead to loss of user convenience or comfortability.

Accordingly, in the present embodiment, power adjustment by the power adjustment resources that are less likely to affect user convenience or comfortability is performed more preferentially. When balancing cannot be achieved only by such power adjustment, power adjustment by the power adjustment resources that may affect user convenience or comfortability is also performed.

More specifically, examples of the power adjustment resources that may affect user convenience or comfortability include the consumption-type DERs (e.g., the air-conditioning facility and the lighting fixture). Examples of the power adjustment resources that are less likely to affect user convenience or comfortability include the power-storage-type DERs (e.g., energy storage system 16, EVSE 17, vehicle 18, and heat storage system 19). In the following description, the air-conditioning facility is used as a representative example of the consumption-type DERs, and energy storage system 16 is used as a representative example of the power-storage-type DERs.

In order to decrease the actual power, CEMS server 2 may change an air-conditioning temperature before and after 15 minutes elapse, thereby decreasing consumed power of the air-conditioning facility. More specifically, CEMS server 2 can set a cooling temperature higher than a user set temperature, or set a heating temperature lower than a user set temperature. When an amount of change in the air-conditioning temperature is only several degrees (e.g., 1° C. to 3° C.), the change in the air-conditioning temperature may be hard to notice for the user. However, the possibility of reduction in user comfortability cannot be denied. In addition, the user may feel deterioration of the effect of air conditioning, and user convenience may be reduced due to the time and effort required to reset the air-conditioning temperature.

In the present embodiment, CEMS server 2 first determines whether or not the stored power in energy storage system 16 can be decreased, thereby decreasing the supply power to microgrid MG to 180 kW. If the stored power in energy storage system 16 is only decreased, the supply power to microgrid MG can be decreased without losing user convenience and comfortability. However, when the supply power cannot be decreased to 180 kW only by decreasing the stored power in energy storage system 16, CEMS server 2 performs power adjustment using the air-conditioning facility within the required range. Even in this case, the amount of change in the air-conditioning temperature can be smaller, as compared with the case of not decreasing the stored power in energy storage system 16, and thus, a reduction in user convenience or comfortability can be minimized.

Figure 3:
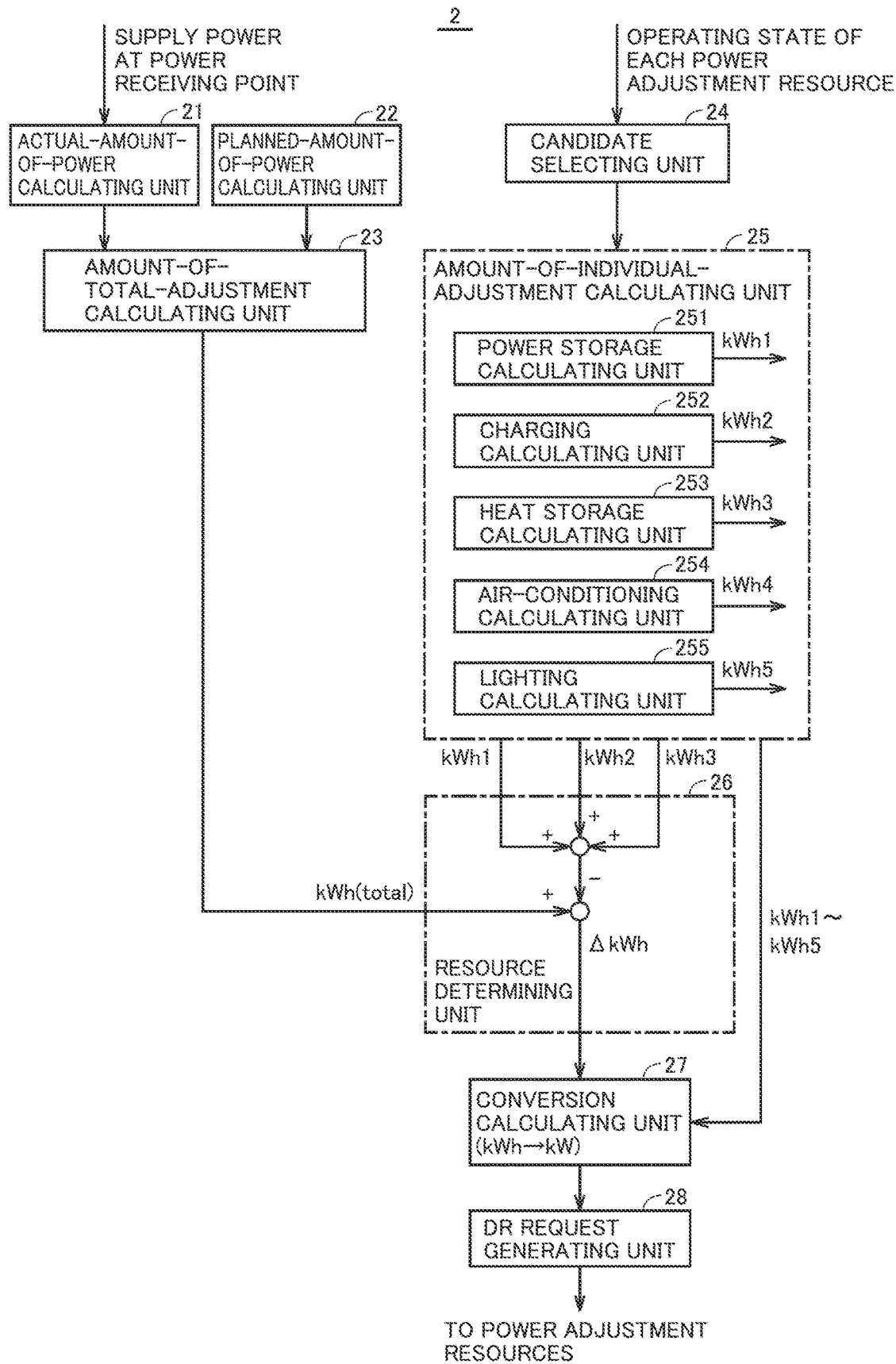
FIG. 3 is a functional block diagram of a CEMS server related to a balancing process in the first embodiment.

FIG. 3 is a functional block diagram of CEMS server 2 related to a balancing process in the first embodiment. Referring to FIGS. 2 and 3, CEMS server 2 determines the power adjustment resources used to achieve balancing, while receiving feedbacks of various types of power from various power adjustment resources in CEMS 1. CEMS server 2 includes an actual-amount-of-power calculating unit 21, a planned-amount-of-power calculating unit 22, an amount-of-total-adjustment calculating unit 23, a candidate selecting unit 24, an amount-of-individual-adjustment calculating unit 25, a resource determining unit 26, a conversion calculating unit 27, and a DR request generating unit 28.

Actual-amount-of-power calculating unit 21 calculates an amount of power (actual amount of power) actually supplied from power system 4 to microgrid MG during a time period from the initial time of 30 minutes, which is the target time period of balancing, to the present time (e.g., when 15 minutes elapse). Actual-amount-of-power calculating unit 21 can calculate the actual amount of power by summing the supply power detected in power reception and transformation facility 3 provided at the power receiving point of microgrid MG. The calculated actual amount of power is output to amount-of-total-adjustment calculating unit 23.

Planned-amount-of-power calculating unit 22 calculates an amount of power (planned amount of power) planned to be supplied from power system 4 to microgrid MG during above-described 30 minutes. The planned amount of power is calculated in accordance with the contract signed between the manager of CEMS 1 and the electric power company. A value of the planned amount of power may be preliminarily calculated and stored in storage device 202 of CEMS server 2. The calculated planned amount of power is output to amount-of-total-adjustment calculating unit 23.

Based on a difference between the actual amount of power and the planned amount of power during the time period from the initial time of above-described 30 minutes to the present time, amount-of-total-adjustment calculating unit 23 calculates an amount of power that requires power adjustment using the power adjustment resources in CEMS 1. In the example shown in FIG. 2, there is a high possibility that the actual amount of power exceeds the planned amount of power when the target time period of balancing elapses, and thus, it is required to decrease the actual amount of power. Since this amount of power is related to CEMS 1 as a whole, this amount of power will also be referred to as "amount of total adjustment kWh(total)" hereinafter. An example of amount of total adjustment kWh(total) is shown by a diagonal line in FIG. 2. Calculated amount of total adjustment kWh(total) is output to resource determining unit 26.

Candidate selecting unit 24 selects candidates of power adjustment resources that can be used for power adjustment, from various power adjustment resources (such as energy storage system 16, EVSE 17, vehicle 18, heat storage system 19, the air-conditioning facility, and the lighting fixture) in CEMS 1. For example, candidate selecting unit 24 obtains an operating state of each of the plurality of power adjustment resources by communication with each power adjustment resource. Then, candidate selecting unit 24 removes, from the candidates, the power adjustment resources that are prohibited to change the power (e.g., the power adjustment resources that are requested to operate with constant power), and selects, as the candidates, the power adjustment resources that are permitted to change the power. Information about the selected power adjustment resources is output to amount-of-individual-adjustment calculating unit 25.

For each of the power adjustment resources selected by candidate selecting unit 24, amount-of-individual-adjustment calculating unit 25 calculates an amount of power that can be adjusted by using the power adjustment resource. Since this amount of adjusted power is calculated individually for each power adjustment resource, this amount of adjusted power is called "amount of individual adjustment" as distinguished from amount of total adjustment kWh(total) related to CEMS 1 as a whole. Amount-of-individual-adjustment calculating unit 25 includes a power storage calculating unit 251, a charging calculating unit 252, a heat storage calculating unit 253, an air-conditioning calculating unit 254, and a lighting calculating unit 255.

Power storage calculating unit 251 calculates, as "amount of individual adjustment kWh1", a decrease in amount of stored power when the stored power in energy storage system 16 is decreased from the present. Amount of individual adjustment kWh1 can be calculated based on, for example, a difference between an upper limit value of an amount of power that can be stored in the power storage device of energy storage system 16 (e.g., an upper limit value in the specification of the power storage device) and an amount of power that is already stored in the power storage device of energy storage system 16 at the present time (current value). In addition, since some power storage devices cannot store electric power very quickly, it is preferable that power storage calculating unit 251 should also take a power reception capability (electric power that can be received per unit time) of energy storage system 16 into consideration.

Charging calculating unit 252 calculates, as "amount of individual adjustment kWh2", a decrease in amount of charging power when the charging power from EVSE 17 to vehicle 18 is decreased from the present. Amount of individual adjustment kWh2 can be calculated based on a free space of the battery of vehicle 18 connected to EVSE 17. As to amount of individual adjustment kWh2, it is preferable to take a power transmission capability of EVSE 17 (electric power that can be output by EVSE 17 per unit time) and a power reception capability of vehicle 18 (electric power that can be received by the battery of vehicle 18 per unit time) into consideration.

Heat storage calculating unit 253 calculates, as "amount of individual adjustment kWh3", a decrease in amount of consumed power when the heat storage in heat storage system 19 is decreased from the present. Amount of individual adjustment kWh3 can be calculated based on a free space of the heat storage tank of heat storage system 19 and an electrothermal conversion capability (electric power that can convert electric energy into thermal energy per unit time) of heat storage system 19.

Air-conditioning calculating unit 254 calculates, as "amount of individual adjustment kWh4", a decrease in amount of consumed power when the consumed power by the air-conditioning facility placed in CEMS 1 is decreased from the present. More specifically, amount of individual adjustment kWh4 refers to an amount of power that can be saved when the cooling temperature of the air-conditioning facility is set higher than the user set temperature by several degrees or the heating temperature of the air-conditioning facility is set lower than the user set temperature by several degrees during a time period from the present time to the end of the target time period (30 minutes) of balancing. Amount of individual adjustment kWh4 can be calculated based on, for example, a specification value related to the consumed power by the air-conditioning facility, an indoor temperature at the present time (detected value by a temperature sensor), an outdoor temperature (e.g., estimated value based on a weather forecast), an amount of solar radiation (estimated value based on a weather forecast), a heat transmission coefficient of the building, and the like.

Lighting calculating unit 255 calculates, as "amount of individual adjustment kWh5", a decrease in amount of consumed power when the consumed power by the lighting fixture placed in CEMS 1 is decreased from the present. Amount of individual adjustment kWh5 refers to an amount of power that can be saved when a light flux of the lighting fixture is made slightly darker than the user set value. Amount of individual adjustment kWh5 can be calculated based on a specification value related to lamp efficiency (unit: lm/W) of the lighting fixture, and the like.

Amounts of individual adjustment kWh1 to kWh3 calculated by amount-of-individual-adjustment calculating unit 25 are output to resource determining unit 26. Amounts of individual adjustment kWh1 to kWh5 are output to conversion calculating unit 27.

Resource determining unit 26 compares amount of total adjustment kWh(total) from amount-of-total-adjustment calculating unit 23 with the amounts of individual adjustment from amount-of-individual-adjustment calculating unit 25, to thereby determine the power adjustment resources used to achieve balancing. More specifically, resource determining unit 26 determines whether or not a total of amounts of individual adjustment kWh1 to kWh3 related to the power-storage-type DERs, of above-described five amounts of individual adjustment kWh1 to kWh5, is equal to or larger than amount of total adjustment kWh(total). In other words, resource determining unit 26 determines whether or not amount of total adjustment kWh(total) can be compensated by a total (kWh1+kWh2+kWh3) of the amounts of power that can be adjusted by energy storage system 16, EVSE 17, vehicle 18, and heat storage system 19.

As in the following equation (1), a difference between the sum (kWh1+kWh2+kWh3) of the amounts of individual adjustment related to the power-storage-type DERs and amount of total adjustment kWh(total) is denoted as $\Delta$kWh.

$$\Delta kWh = kWh1 + kWh2 + kWh3 - kWh(total) \quad (1)$$

When $\Delta$kWh$\geq$0, resource determining unit 26 determines to perform power adjustment using only the power-storage-type DERs. In contrast, when $\Delta$kWh<0, resource determining unit 26 determines to perform power adjustment using the consumption-type DERs in addition to the power-storage-type DERs. The determination as to the used power adjustment resources is output to conversion calculating unit 27.

Conversion calculating unit 27 performs a calculation process on the amounts of individual adjustment for each power adjustment resource determined by resource determining unit 26, and calculates electric power used to control the power adjustment resource. More specifically, for each power adjustment resource, conversion calculating unit 27 converts the amounts of individual adjustment from the amount of power (unit: kWh) into power (unit: kW), using the remaining time period of the target time period of balancing. As an example, when the amount of individual adjustment is 10 kWh and the remaining time period is 15 minutes, 10 kWh×(60 minutes/15 minutes)=40 kW can be obtained. The result of the calculation process by conversion calculating unit 27 is output to DR request generating unit 28.

DR request generating unit 28 generates a DR request for performing power adjustment using each power adjustment resource determined by resource determining unit 26. The generated DR request is output to the target power adjustment resources.

<Control Flow>

Figure 4:
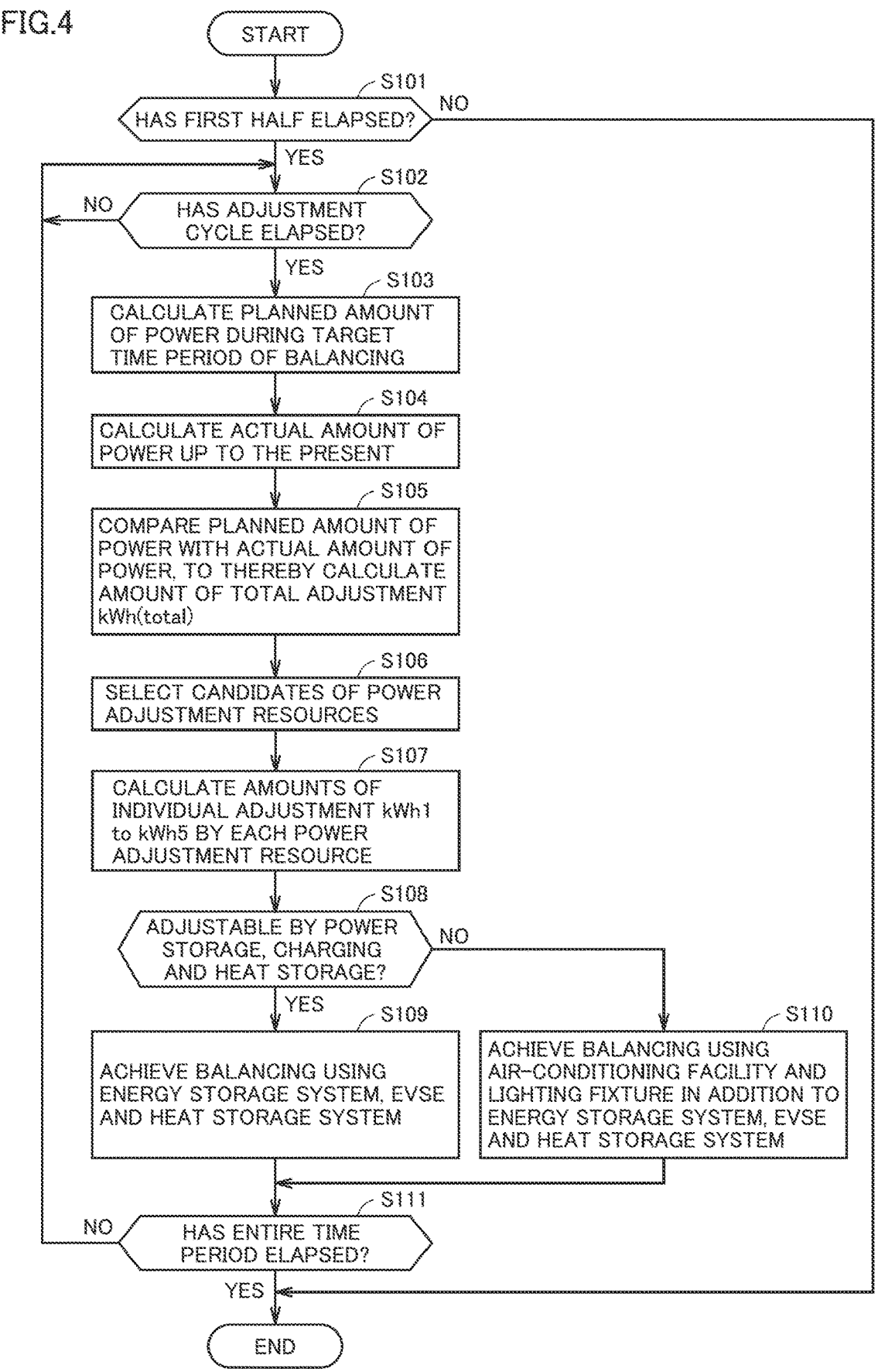
FIG. 4 is a flowchart showing the balancing process in the first embodiment.

FIG. 4 is a flowchart showing a balancing process in the first embodiment. This flowchart is performed when a predetermined condition is satisfied (e.g., every time a predetermined time period elapses). Although each step is implemented by software processing by CEMS server 2, each step may be implemented by hardware (electric circuit) arranged in CEMS server 2. Hereinafter, each step will be abbreviated as "S".

In S101, CEMS server 2 determines whether or not the first half (e.g., 15 minutes) of the target time period of balancing has elapsed. When the first half of the target time period of balancing has not yet elapsed (NO in S101), CEMS server 2 ends the process. When the second half of the target time period of balancing comes (YES in S101), CEMS server 2 moves the process to S102. Dividing the target time period of balancing into the first half and the second half is merely by way of example, and the target time period of balancing may be divided into, for example, the first 10 minutes and the second 20 minutes.

In S102, CEMS server 2 determines whether or not a predetermined adjustment cycle (e.g., one minute) has elapsed. Until the adjustment cycle elapses (NO in S102), CEMS server 2 awaits. When the adjustment cycle has elapsed (YES in S102), CEMS server 2 moves the process to S103.

In S103, CEMS server 2 calculates the amount of power (planned amount of power) that is planned to be supplied from power system 4 to microgrid MG during the first half of the target time period of balancing. The planned amount of power is calculated in accordance with the contract that is preliminarily signed with the electric power company.

In S104, CEMS server 2 calculates the amount of power (actual amount of power) that is actually supplied from power system 4 to microgrid MG during the first half of the target time period of balancing. As described above, the actual amount of power can be calculated by summing the supply power detected in power reception and transformation facility 3 provided at the power receiving point of microgrid MG.

In S105, CEMS server 2 compares the planned amount of power calculated in S103 with the actual amount of power calculated in S104, to thereby calculate amount of total adjustment kWh(total). In the first embodiment, the actual amount of power is larger than the planned amount of power, and thus, (actual amount of power−planned amount of power) can be amount of total adjustment kWh(total).

In S106, CEMS server 2 obtains data about a current use state (use including power generation, power storage, consumption, and supply) of each power adjustment resource in CEMS 1. The data includes data about the currently used power of each power adjustment resource, and data about whether or not the used power can be changed (change is permitted/prohibited). Based on the obtained data, CEMS server 2 determines candidates of power adjustment resources that can be used to compensate for amount of total adjustment kWh(total).

In S107, CEMS server 2 calculates the amounts of individual adjustment (kW1 to kW5) for each candidate determined in S106. Since the calculation method has been described in detail with reference to FIG. 3, description will not be repeated.

In S108, CEMS server 2 determines whether or not amount of total adjustment kWh can be compensated by power adjustment for decreasing a degree of power storage, charging and heat storage by the power adjustment resources. Specifically, CEMS server 2 determines whether or not the total (kWh1+kWh2+kWh3) of the amounts of individual adjustment by the power-storage-type DERs (energy storage system 16, EVSE 17, vehicle 18, and heat storage system 19) is equal to or larger than amount of total adjustment kWh(total) (whether or not ΔkWh≥0).

When ΔkWh≥0 (YES in S108), CEMS server 2 generates the DR request such that balancing is achieved by power adjustment using the power-storage-type DERs (S109). In contrast, when ΔkWh<0 (NO in S108), CEMS server 2 generates the DR request such that balancing is achieved by power adjustment using the consumption-type DERs in addition to the power-storage-type DERs (S110). After S109 or S110, CEMS server 2 moves the process to S111.

In S111, CEMS server 2 determines whether or not the entire target time period (30 minutes) of balancing has elapsed. When the target time period of balancing has not elapsed (NO in S111), CEMS server 2 returns the process to S102. As a result, the same process is performed in a next adjustment time period. When the target time period of balancing has elapsed (YES in S111), CEMS server 2 ends a series of process.

As described above, in the first embodiment, when it is required to decrease the supply power to microgrid MG in the middle of the target time period of balancing in order to achieve balancing, CEMS server 2 performs power adjustment using the power-storage-type DERs (e.g., energy storage system 16, EVSE 17, vehicle 18, and heat storage system 19) more preferentially than power adjustment using the consumption-type DERs (e.g., the air-conditioning facility and the lighting fixture). That is, when power adjustment for decreasing the power consumption in the user's living environment is required, power adjustment using the power-storage-type DERs that are less likely to affect user convenience or comfortability is performed more preferentially than power adjustment using the consumption-type DERs that may affect user convenience or comfortability. Therefore, according to the first embodiment, a reduction in user convenience and comfortability when achieving balancing can be suppressed as much as possible.

In the first embodiment, energy storage system 16, EVSE 17, vehicle 18, and heat storage system 19 have been described as the power-storage-type DERs that are less likely to affect user convenience or comfortability. However, the use of all of these power adjustment resources is not necessarily required, and at least one of these power adjustment resources may only be used. The same applies as well to a second embodiment described below.

In addition, the air-conditioning facility and the lighting fixture have been described as the consumption-type DERs that may affect user convenience or comfortability. However, only one of the air-conditioning facility and the lighting fixture may be used. The user is less likely to be aware of power adjustment using the air-conditioning facility than power adjustment using the lighting fixture. In addition, the power consumption of the air-conditioning facility is often larger than the power consumption of the lighting fixture, and thus, the effect of power adjustment using the air-conditioning facility is also higher. Therefore, when only one of the air-conditioning facility and the lighting fixture is used, it is desirable that power adjustment using the air-conditioning facility should be performed more preferentially.

Second Embodiment

In the first embodiment, description has been given of the case in which it is required to decrease the supply power to microgrid MG in the middle of the target time period of balancing. In the second embodiment, description will be given of a case in which it is required to increase the supply power to microgrid MG in the middle of the target time period of balancing. A configuration of a power management system in the second embodiment is equivalent to the configuration of power management system 100 in the first embodiment (see FIG. 1).

Figure 5:
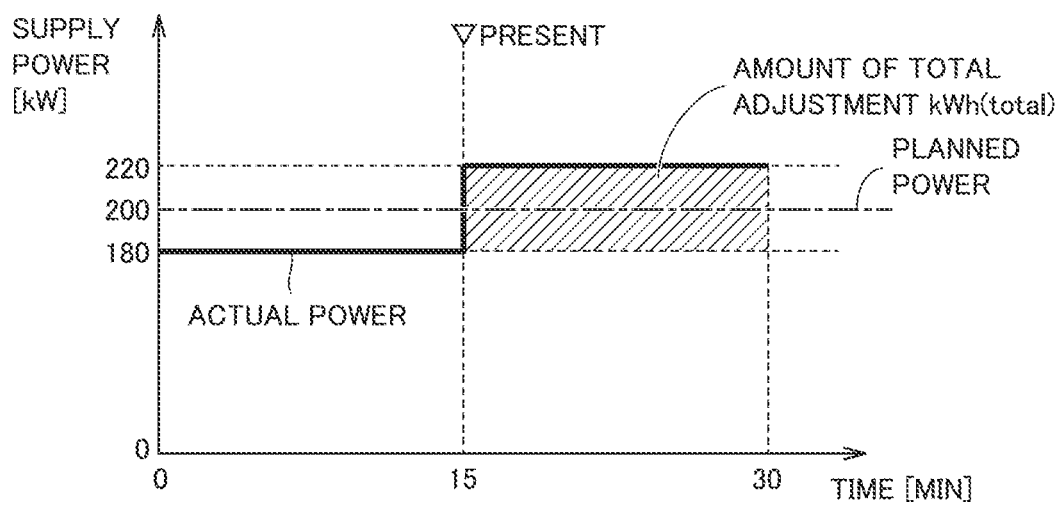
FIG. 5 is a time chart for illustrating an example of 30-minute balancing in a second embodiment.

FIG. 5 is a time chart for illustrating an example of 30-minute balancing in the second embodiment. Similarly to FIG. 2, in FIG. 5 as well, the amount of power (planned amount of power) supplied from power system 4 to microgrid MG for 30 minutes (target time period of balancing) is set at 100 kWh in accordance with the contract. Assuming that the supply power is constant, the planned power is 200 kW.

When the first half (15 minutes) have elapsed, CEMS server 2 checks the amount of supply power from power system 4 to microgrid MG. In the second embodiment, the actual supply power is constant at 180 kW, and thus, a situation in which the supply power is set at 220 kW, which is an average of the supply power, during the second half (15 minutes) is assumed. Therefore, it is required to output the DR request to the power adjustment resources in CEMS 1 such that the supply power is increased from 180 kW to 220 kW.

Figure 6:
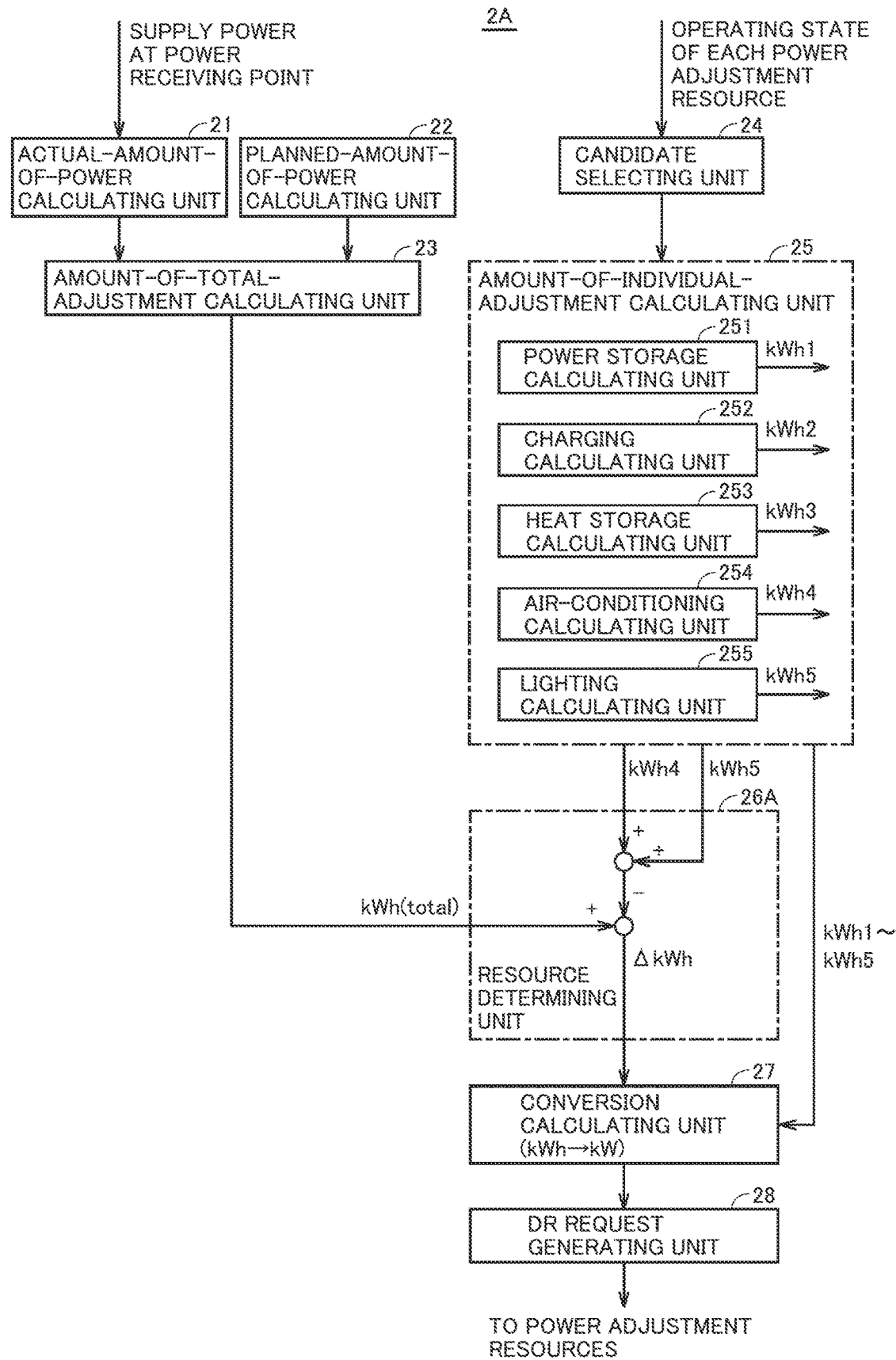
FIG. 6 is a functional block diagram of a CEMS server related to a balancing process in the second embodiment.

FIG. 6 is a functional block diagram of a CEMS server 2A related to a balancing process in the second embodiment. CEMS server 2A in the second embodiment is different from CEMS server 2 in the first embodiment (see FIG. 3) in that CEMS server 2A includes a resource determining unit 26A instead of resource determining unit 26.

Similarly to resource determining unit 26, resource determining unit 26A compares amount of total adjustment kWh(total) from amount-of-total-adjustment calculating unit 23 with the amounts of individual adjustment from amount-of-individual-adjustment calculating unit 25, to thereby determine the power adjustment resources used to achieve balancing. However, resource determining unit 26A in the second embodiment determines whether or not a total of amounts of individual adjustment kWh4 and kWh5 related to the consumption-type DERs, of above-described five amounts of individual adjustment kWh1 to kWh5, is equal to or larger than amount of total adjustment kWh (total). In other words, resource determining unit 26A determines whether or not amount of total adjustment kWh(total) can be compensated by the total (kWh4+kWh5) of the amounts of power that can be adjusted by the air-conditioning facility and the lighting fixture.

In the second embodiment, a difference between the sum (kWh4+kWh5) of the amounts of individual adjustment related to the consumption-type DERs and amount of total adjustment kWh(total) is denoted as ΔkWh (refer to the following equation (2)).

$$\Delta kWh = kWh4 + kWh5 - kWh(total) \qquad (2)$$

When ΔkWh≥0, resource determining unit 26A determines to perform power adjustment using only the consumption-type DERs. In contrast, when ΔkWh<0, resource determining unit 26A determines to perform power adjustment using the power-storage-type DERs (e.g., energy storage system 16, EVSE 17, vehicle 18, and heat storage system 19) in addition to the consumption-type DERs. Since the other functional blocks are similar to the corresponding functional blocks shown in FIG. 3, detailed description will not be repeated.

Figure 7:
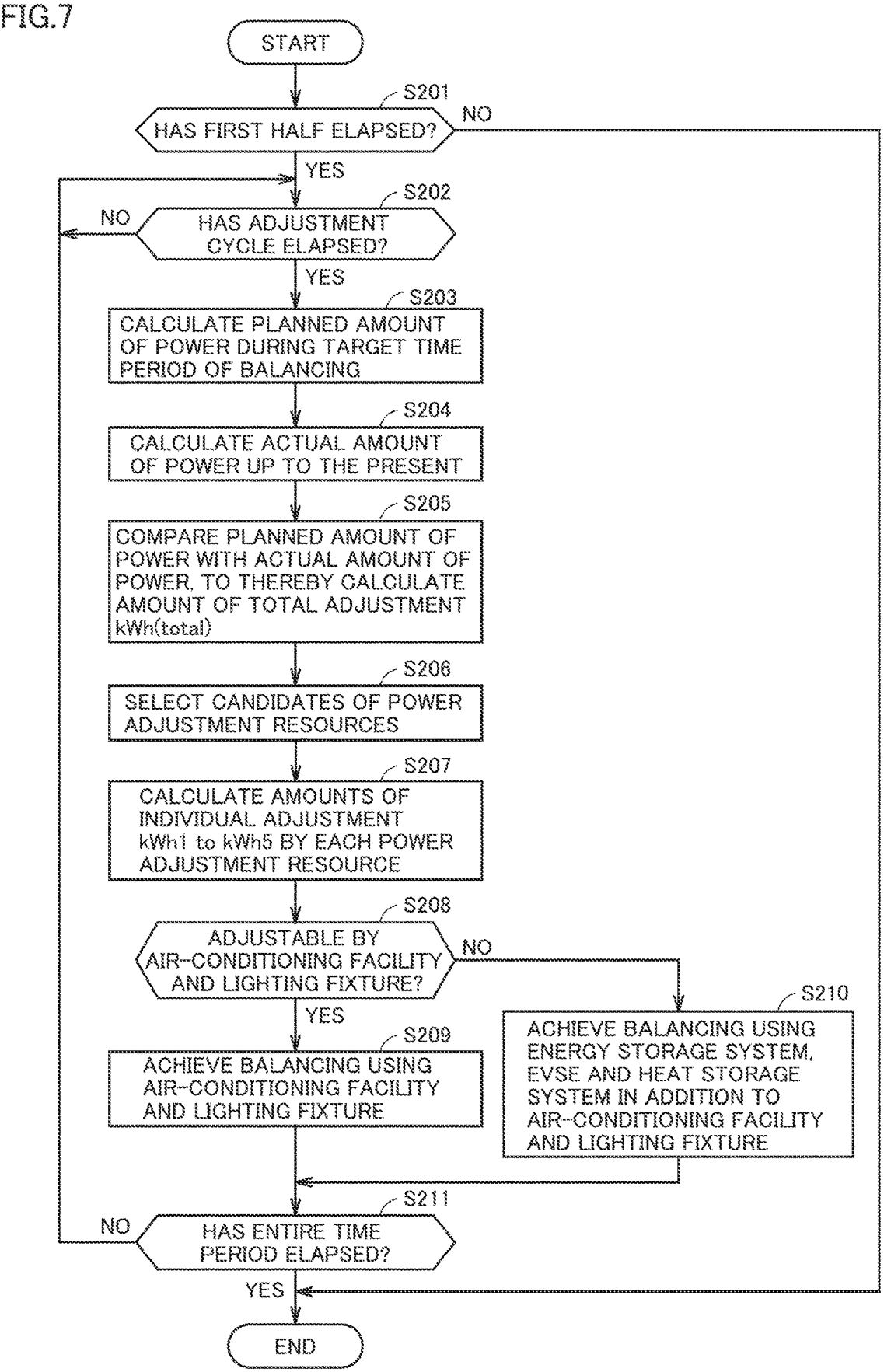
FIG. 7 is a flowchart showing the balancing process in the second embodiment.

FIG. 7 is a flowchart showing the balancing process in the second embodiment. The processing in S201 to S207 is basically similar to the processing in S101 to S107 in the first embodiment (see FIG. 4). However, in the second embodiment, the actual amount of power is smaller than the planned amount of power when the first half of the target time period of balancing has elapsed, and thus, (planned amount of power−actual amount of power) can be amount of total adjustment kWh(total).

In S208, CEMS server 2 determines whether or not amount of total adjustment kWh can be compensated by power adjustment for increasing a degree of air conditioning and lighting by the power adjustment resources. Specifically, CEMS server 2 determines whether or not the total (kWh4+ kWh5) of the amounts of individual adjustment by the consumption-type DERs is equal to or larger than amount of total adjustment kWh(total) (whether or not ΔkWh≥0).

When ΔkWh≥0 (YES in S208), CEMS server 2 generates the DR request such that balancing is achieved by power adjustment using the consumption-type DERs (S209). Specifically, CEMS server 2 sets the cooling temperature of the air-conditioning facility lower than the user set temperature by several degrees, or sets the heating temperature of the air-conditioning facility higher than the user set temperature by several degrees until the end of the target time period of balancing. In addition, CEMS server 2 makes a light flux of the lighting fixture slightly brighter than the user set value.

In contrast, when ΔkWh<0 (NO in S208), CEMS server 2 generates the DR request such that balancing is achieved by power adjustment using the power-storage-type DERs in addition to the consumption-type DERs (S210). The processing in S211 performed after the processing in S209 or S210 is similar to the processing in S111 in the first embodiment.

As described above, in the second embodiment, when it is required to increase the supply power to microgrid MG in the middle of the target time period of balancing in order to achieve balancing, CEMS server 2 performs power adjustment using the consumption-type DERs (e.g., the air-conditioning facility and the lighting fixture) more preferentially than power adjustment using the power-storage-type DERs (e.g., energy storage system 16, EVSE 17, vehicle 18, and heat storage system 19). That is, as to power adjustment for increasing the power consumption in the user's living environment, power adjustment using the consumption-type DERs that may affect user convenience or comfortability is performed more preferentially than power adjustment using the power-storage-type DERs that are less likely to affect user convenience or comfortability. Even when the cooling temperature of the air-conditioning facility is decreased or the heating temperature of the air-conditioning facility is increased, the user only feels the shortening of the time required for air conditioning and the enhancement of the effect of air conditioning, and thus, a reduction in user comfortability is less likely to occur. In addition, even when the lighting fixture becomes slightly brighter, a reduction in user convenience is less likely to occur. Therefore, according to the second embodiment, a reduction in user convenience and comfortability when achieving balancing can be suppressed as much as possible.

Although the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A power management system that manages power supply and demand in a power grid, the power management system comprising:
   a plurality of power adjustment resources used to adjust supply power from a power system to the power grid; and
   a controller that outputs a demand response request to the plurality of power adjustment resources such that balancing is achieved, the balancing being control for matching an actual amount of power expected to be used in a prescribed time period with a planned amount of power to be used by the end of the prescribed time period, wherein
   the plurality of power adjustment resources include:
      a power-storage-type distributed energy resource (DER) that stores the supply power in an energy form of at least one of electricity, heat and gas fuel; and
      a consumption-type DER that consumes the supply power by at least one of air conditioning and lighting, and
   in a case where the controller determines in the middle of the prescribed time period that the actual amount of power expected to be used in the prescribed time period will exceed the planned amount of power to be used by the end of the prescribed time period, the controller performs the following steps:
   (a) when the excess of the actual amount of power expected to be used in the prescribed time period can be eliminated by decreasing storage of the supply power by the power-storage-type DER, the controller outputs, to the power-storage-type DER, the demand response request for decreasing storage of the supply power in comparison with a case where the controller determines that the actual amount of power expected to be used in the prescribed time period will not exceed the planned amount of power to be used by the end of the prescribed time period, but the controller does not output, to the consumption-type DER, the demand response request for decreasing consumption of the supply power in comparison with the case where the controller determines that the actual amount of power expected to be used in the prescribed time period will not exceed the planned amount of power to be used by the end of the prescribed time period, and
   (b) when the excess of the actual amount of power expected to be used in the prescribed time period cannot be eliminated only by decreasing storage of the supply power by the power-storage-type DER, the controller outputs, to the power-storage-type DER, the demand response request for decreasing storage of the supply power in comparison with the case where the controller determines that the actual amount of power expected to be used in the prescribed time period will not exceed the planned amount of power to be used by the end of the prescribed time period, and also outputs, to the consumption-type DER, the demand response request for decreasing consumption of the supply power in comparison with the case where the controller determines that the actual amount of power expected to be used in the prescribed time period will not exceed the planned amount of power to be used by the end of the prescribed time period.

2. The power management system according to claim 1, wherein in the case where the controller determines in the middle of the prescribed time period that the actual amount of power expected to be used in the prescribed time period is smaller than the planned amount of power to be used by the end of the prescribed time period, the controller outputs, to the consumption-type DER more preferentially than to the power-storage-type DER, the demand response request for increasing the actual amount of power expected to be used in the prescribed time period in comparison with the case where the controller determines that the actual amount of power expected to be used in the prescribed time period is not smaller than the planned amount of power to be used by the end of the prescribed time period.

3. The power management system according to claim 2, wherein in the case where the controller determines in the middle of the prescribed time period that the actual amount of power expected to be used in the prescribed time period is smaller than the planned amount of power to be used by the end of the prescribed time period, the controller performs the following steps:

(c) when the shortage of the actual amount of power expected to be used in the prescribed time period relative to the planned amount of power to be used by the end of the prescribed time period can be eliminated by increasing consumption of the supply power by the consumption-type DER, the controller outputs, to the consumption-type DER, the demand response request for increasing consumption of the supply power in comparison with the case where the controller determines that the actual amount of power expected to be used in the prescribed time period is not smaller than the planned amount of power to be used by the end of the prescribed time period, but does not output, to the power-storage-type DER, the demand response request for increasing storage of the supply power in comparison with the case where the controller determines that the actual amount of power expected to be used in the prescribed time period is not smaller than the planned amount of power to be used by the end of the prescribed time period, and (d) when the shortage of the actual amount of power expected to be used in the prescribed time period relative to the planned amount of power to be used by the end of the time period cannot be eliminated only by increasing consumption of the supply power by the consumption-type DER, the controller outputs, to the consumption-type DER, the demand response request for increasing consumption of the supply power in comparison with the case where the controller determines that the actual amount of power expected to be used in the prescribed time period is not smaller than the planned amount of power to be used by the end of the prescribed time period, and also outputs, to the power-storage-type DER, the demand response request for increasing storage of the supply power in comparison with the case where the controller determines that the actual amount of power expected to be used in the prescribed time period is not smaller than the planned amount of power to be used by the end of the prescribed time period.

4. A server that manages a plurality of power adjustment resources used to adjust supply power from a power system to a power grid, wherein the plurality of power adjustment resources include:
a power-storage-type DER that stores the supply power in an energy form of at least one of electricity, heat and gas fuel; and
a consumption-type DER that consumes the supply power by at least one of air conditioning and lighting, the server includes:
a processor; and
a memory that stores a program executed by the processor,
the processor outputs a demand response request to the plurality of power adjustment resources such that balancing is achieved, the balancing being control for matching an actual amount of power expected to be used in a prescribed time period with a planned amount of power to be used by the end of the prescribed time period, and in a case where the processor determines in the middle of the prescribed time period that the actual amount of power expected to be used in the prescribed time period exceeds the planned amount of power to be used by the end of the prescribed time period, the processor performs the following steps:

(a) when the excess of the actual amount of power expected to be used in the prescribed time period can be eliminated by decreasing storage of the supply power by the power-storage-type DER, the processor outputs, to the power-storage-type DER, the demand response request for decreasing storage of the supply power in comparison with a case where the processor determines that the actual amount of power expected to be used in the prescribed time period will not exceed the planned amount of power to be used by the end of the prescribed time period, but the processor does not output, to the consumption-type DER, the demand response request for decreasing consumption of the supply power in comparison with the case where the processor determines that the actual amount of power expected to be used in the prescribed time period will not exceed the planned amount of power to be used by the end of the prescribed time period, and (b) when the excess of the actual amount of power that will be used in the prescribed time period cannot be eliminated only by decreasing storage of the supply power by the power-storage-type DER, the processor outputs, to the power-storage-type DER, the demand response request for decreasing storage of the supply power in comparison with the case where the processor determines that the actual amount of power expected to be used in the prescribed time period will not exceed the planned amount of power to be used by the end of the prescribed time period, and also outputs, to the consumption-type DER, the demand response request for decreasing consumption of the supply power in comparison with the case where the processor determines that the actual amount of power expected to be used in the prescribed time period will not exceed the planned amount of power to be used by the end of the prescribed time period.

5. The server according to claim 4, wherein
in the case where the processor determines in the middle of the prescribed time period that the actual amount of power expected to be used in the prescribed time period is less than the planned amount of power to be used by the end of the prescribed time period, the processor outputs, to the consumption-type DER more preferentially than to the power-storage-type DER, the demand response request for increasing the actual amount of power expected to be used in the prescribed time period in comparison with a case where the processor determines that the actual amount of power expected to be used in the prescribed time period is not less than the planned amount of power to be used by the end of the prescribed time period.

6. The server according to claim 5, wherein
in the case where the processor determines in the middle of the prescribed time period that the actual amount of power expected to be used in the prescribed time period is smaller than the planned amount of power to be used by the end of the prescribed time period, the processor performs the following steps:
(c) when the shortage of the actual amount of power expected to be used in the prescribed time period can be eliminated by increasing consumption of the supply power by the consumption-type DER, the processor outputs, to the consumption-type DER, the demand response request for increasing consumption of the supply power in comparison with a case where the processor determines that the actual amount of power expected to be used in the prescribed time period is not smaller than the planned amount of power to be used by the end of the prescribed time period, but does not output, to the power-storage-type DER, the demand response request for increasing storage of the supply power in comparison with the case where the processor determines that the actual amount of power expected to be used in the prescribed time period is not less than the planned amount of power to be used by the end of the prescribed time period, and
(d) when the shortage of the actual amount of power expected to be used by the end of the prescribed time period cannot be eliminated only by increasing consumption of the supply power by the consumption-type DER, the processor outputs, to the consumption-type DER, the demand response request for increasing consumption of the supply power in comparison with the case where the processor determines that the actual amount of power expected to be used in the prescribed time period is not less than the planned amount of power to be used by the end of the prescribed time period, and also outputs, to the power-storage-type DER, the demand response request for increasing storage of the supply power in comparison with the case where the processor determines that the actual amount of power expected to be used in the prescribed time period is not less than the planned amount of power to be used by the end of the prescribed time period.

7. A power supply and demand adjustment method that manages a plurality of power adjustment resources used to adjust supply power from a power system to a power grid, wherein
the plurality of power adjustment resources receive a demand response request for achieving balancing, the balancing being control for matching an actual amount of power expected to be used in a prescribed time period with a planned amount of power to be used by the end of the prescribed time period,
the plurality of power adjustment resources include:
a power-storage-type DER that stores the supply power in an energy form of at least one of electricity, heat and gas fuel; and
a consumption-type DER that consumes the supply power by at least one of air conditioning and lighting,
the method comprising:
determining, using a controller, in the middle of the prescribed time period whether or not the actual amount of power expected to be used in the prescribed time period exceeds the planned amount of power to be used by the end of the prescribed time period; and
in a case where the controller determines that the actual amount of power expected to be used in the prescribed time period exceeds the planned amount of power to be used by the end of the prescribed time period, the controller performs the steps of:
(a) when the excess of the actual amount of power expected to be used in the prescribed time period can be eliminated by decreasing storage of the supply power by the power-storage-type DER, outputting, to the power-storage-type DER, the demand response request for decreasing storage of the supply power in comparison with a case where the controller determines that the actual amount of power expected to be used in the prescribed time period does not exceed the planned amount of power to be used by the end of the prescribed time period, but not outputting, to the consumption-type DER, the demand response request for decreasing consumption of the supply power in comparison with the case where the controller determines that the actual amount of power expected to be used in the prescribed time period does not exceed the planned amount of power to be used by the end of the prescribed time period, and
(b) when the excess of the actual amount of power cannot be eliminated only by decreasing storage of the supply power by the power-storage-type DER, outputting, to the power-storage-type DER, the demand response request for decreasing storage of the supply power in comparison with the case where the controller determines that the actual amount of power expected to be used in the prescribed time period does not exceed the planned amount of power to be used by the end of the prescribed time period, and also outputting, to the consumption-type DER, the demand response request for decreasing consumption of the supply power in comparison with the case where the controller determines that the actual amount of power expected to be used in the prescribed time period does not exceed the planned amount of power to be used by the end of the prescribed time period.

8. The power supply and demand adjustment method according to claim 7, further comprising:

the controller determining in the middle of the prescribed time period whether or not the actual amount of power expected to be used in the prescribed time period is less than the planned amount of power to be used by the end of the prescribed time period; and in the case where the controller determines that the actual amount of power expected to be used in the prescribed time period is less than the planned amount of power to be used by the end of the prescribed time period, outputting, to the consumption-type DER more preferentially than to the power-storage-type DER, the demand response request for increasing the actual amount of power expected to be used in the prescribed time period in comparison with the case where the controller determines that the actual amount of power expected to be used in the prescribed time period is not less than the planned amount of power to be used by the end of the prescribed time period.

9. The power supply and demand adjustment method according to claim 8, wherein the outputting includes: in the case where the controller determines that the actual amount of power expected to be used in the prescribed time period is smaller than the planned amount of power to be used by the end of the prescribed time period, the controller performs the steps of:

(c) when the shortage of the actual amount of power expected to be used in the prescribed time period can be eliminated by increasing consumption of the supply power by the consumption-type DER, outputting, to the consumption-type DER, the demand response request for increasing consumption of the supply power in comparison with the case where the controller determines that the actual amount of power expected to be used in the prescribed time period is not less than the planned amount of power to be used by the end of the prescribed time period, but not outputting, to the power-storage-type DER, the demand response request for promoting storage of the supply power in comparison with the case where the controller determines that the actual amount of power expected to be used in the prescribed time period is not less than the planned amount of power to be used by the end of the prescribed time period, and (d) when the shortage of the actual amount of power expected to be used in the prescribed time period cannot be eliminated only by increasing consumption of the supply power by the consumption-type DER, outputting, to the consumption-type DER, the demand response request for increasing consumption of the supply power in comparison with the case where the controller determines that the actual amount of power expected to be used in the prescribed time period is not less than the planned amount of power to be used by the end of the prescribed time period, and also outputting, to the power-storage-type DER, the demand response request for promoting storage of the supply power in comparison with the case where the controller determines that the actual amount of power expected to be used in the prescribed time period is not less than the planned amount of power to be used by the end of the prescribed time period.

* * * * *